March 2, 1943.    V. O. RING    2,312,730
DISPENSER
Filed July 24, 1940
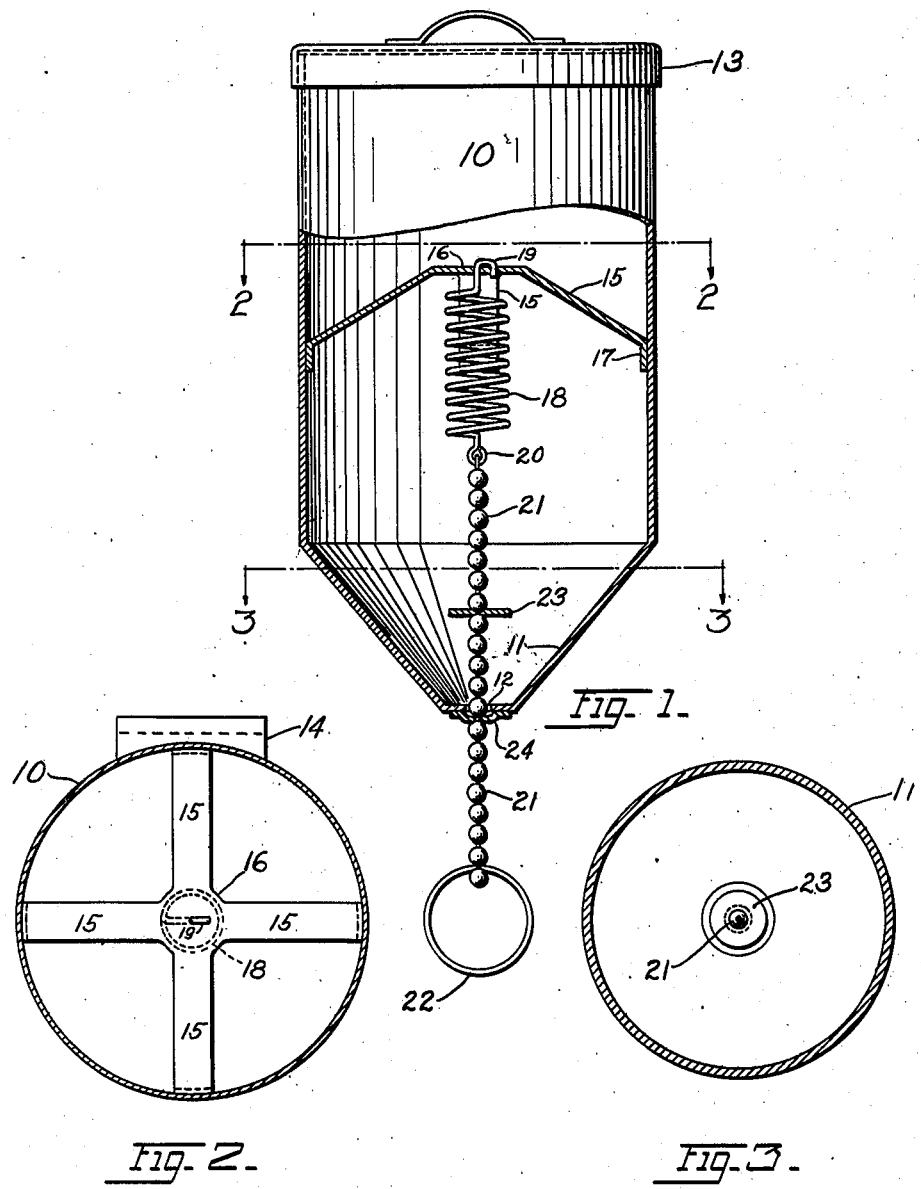
VERN ORRIEN RING
INVENTOR.
BY John E Eastbck
ATTORNEY.

Patented Mar. 2, 1943

2,312,730

UNITED STATES PATENT OFFICE 2,312,730

DISPENSER

Vern Orrien Ring, Los Angeles, Calif., assignor to Turco Products, Inc., Los Angeles, Calif., a corporation of California Application July 24, 1940, Serial No. 347,333

6 Claims. (Cl. 221—62)

This invention relates to improvements in dispensers, and has for its principal object the provision of a small, compact, inexpensive apparatus for instantly delivering desired quantities of dry powdered or granular substances with a minimum of effort and inconvenience on the part of the user.

A further object is the provision of apparatus of this type which shall be of strong, durable construction and composed of a minimum of parts functioning efficiently under all conditions so that the device is not likely to get out of order, consequently requiring little or no attention or expense from the standpoint of maintenance and repairs.

Other and further objects of the invention will be apparent from the disclosures in the accompanying drawing and following specification.

The invention, in a preferred form, is illustrated in the drawing and hereinafter more fully described.

In the drawing:

Figure 1 is a front elevation, partly in section, showing the dispenser of my invention.

Figure 2 is a sectional view taken on the line 2—2 of Figure 1.

Figure 3 is a sectional view taken on the line 3—3 of Figure 1.

As shown in the drawing:

The reference numeral 10 indicates generally a hollow, open-top container made of any suitable material, the lower portion of which is inclined to form a hopper or chute 11 having a lower centrally located restricted outlet orifice or dispensing opening 12. A removable handle-equipped lid 13 is preferably provided to form a closure for the top of the container.

The container 10 is adapted to be fastened to a standard or other support by any conventional means, such as, for example, by a hanger element 14.

Mounted interiorly of the container 10 and preferably positioned centrally thereof is a bracket element or spider 15 of any suitable design and composition. This spider has an apertured central portion or hub 16, the radiating arms of which are securely fastened to the sidewall of the container as shown at 17, by any suitable method.

Suspended centrally of the container below the hub 16 is a coil spring 18 having a hooked upper end 19 which engages the apertured hub 16 and is supported thereby, while the spring's lower end is similarly bent to form a hook 20 engaging and securely holding the upper end of a section of segmented material 21, preferably a beaded element such as ball-chain, which is inexpensive, readily available on the market, flexible, and composed of small globules which I have found ideally suited for the purpose.

The chain 21 is of sufficient length to extend downwardly through the body of the container and depend exteriorly of the device through the dispensing orifice 12 which is preferably just wide enough to allow of free upward and downward movement of the chain segments therethrough. A finger rest 22 is attached to the lower end of the chain 21 exteriorly of the device for convenience in drawing the chain downward as well as for the further purposes hereinafter set forth.

After the container 10 is filled with a powdered or granular substance a portion of the contents will be discharged through the orifice 12 at each downward drawing of the chain 21 against the tension of the spring 18, since certain of the material adjacent the inner portion of the chain 21 will then be carried downward and outward through the opening 12 and forcibly expelled therefrom by the pressure involved.

Releasing of the chain's tension by the operator allows the spring 18 to contract and resume its original position in readiness for repetition of the procedure, and the upward movement of the ball segments into the opening 12 reverses the pressure and prevents discharge of the material. These segments also normally prevent escape of material through the opening 12 when the device is not in use. Expansion and contraction of the spring 18 during operation of the device results in agitation of the material within the container so as to keep same in loose, dispensable condition at all times, while the upward and downward movement of the element 21 through the opening 24 positively prevents clogging of the dispensing passage.

To increase the efficiency of the device I prefer to equip the element 21 with a pair of washers or stop rings 23, 24. The upper washer 23 is located interiorly of the container a suitable distance above the dispensing orifice 12, where it surrounds and is securely attached in nonslidable relationship to the element 21, its purpose being to cause agitation of the container's contents by its upward and downward movement and also to increase the downward pressure over the material during the dispensing operation, and finally to measure or regulate the amount of material dispensed by stopping the downward pulling of the element 21 beyond the point necessary for allowing the escape of the proper amount of material, by contacting and forming an inner seal or cover over the opening 12 in an obvious manner. Thus the quantity of material dispensed at one operation can be regulated by proper positioning of the upper washer 23.

The lower washer 24 is similarly mounted along the element 21 but exteriorly of the dispenser, and is preferably positioned so as to form a more perfect exterior closure or seal for the orifice 12 when the device is not in use by being held thereagainst by slight tension of the spring 18 when the latter contracts after the dispensing operation.

As best shown in Figure 1, the finger rest 22 is preferably formed in the shape of a ring which may comfortably receive the finger of the operator, who, while extending his hand palm-upward under the device, may, by inserting a finger into the ring in this fashion and drawing same downward, cause a measured flow of the material to fall into the palm of his hand, thus requiring the use of only the one hand for both actuating the device and receiving the dispensed material. This feature is especially desirable when the device is used to dispense powdered or granulated soaps or similar cleaning materials, since by this method contact of only the knuckle or back portion of one finger with the ring 22 is necessary, whereby soiling of the chain and ring and resulting unsanitary conditions may be prevented.

It will be apparent that by the use of this invention any type of ordinary container may easily be converted into a dispenser of the type herein described. Thus by designing the chain supporting element 15 so that the same may be removably installed in many varieties of packages in which powdered or granulated merchandise is usually sold, the carrier 21 and its supporting assembly may be easily transferred from one container to another, it being only necessary to perforate the substitute container at some suitable point to provide an opening through which the carrier 21 may move. In a universal type of structure such as that just suggested it would not be necessary to omit the stop elements 23 and 24, as these parts could be made readily detachable from the element 21 by employing conventional types of fasteners, such as snaps, hooks, clips, or the like.

While I have herein illustrated and described only one form of structure embodying my invention, it will be obvious that many changes may be made and numerous details of construction varied throughout a wide range without departing from the principles involved.

I claim as my invention:

1. A device for dispensing granular material comprising a container having a dispensing orifice therein and means for moving material from the container through the orifice, including an elongated dredge member disposed at its inner end within the container and slidably extending at its other end through the orifice, said dredge member being comprised of a series of spherical sections presenting annular material carrying spaces therebetween and each being of a diameter snugly fitting but passable through the orifice.

2. A device for dispensing granular material comprising a container having a dispensing orifice through its bottom and means for moving material from the container through the orifice, including a ball chain resiliently secured at its inner end within the container and slidably extending at its outer end through the orifice, each ball of the chain being of a diameter snugly fitting but passable through the orifice, and a manual pull element secured to the outer end of the chain beneath said orifice.

3. A device for dispensing granular material comprising a container having a round dispensing orifice therein and means for moving material through the orifice, including a flexible string of spherical drag elements, said string extending from within the container to the exterior thereof through said orifice, and each of said spherical drag elements being of a diameter snugly fitting but passable through the orifice.

4. A device for dispensing granular material comprising a container having a dispensing orifice through its bottom and means for moving material from the container through the orifice, including an elongated dredge member disposed at its inner end within the container and slidably extending at its other end outwardly through the orifice, said dredge member being comprised of a series of spherical sections presenting material carrying spaces therebetween and each being of a diameter snugly fitting but passable through the orifice, and a stop carried by the dredge member at a point normally spaced inwardly from the orifice, said stop being engageable against the periphery of the orifice upon outward sliding movement of the dredge member and being adjustable along the dredge element whereby to be selectively positioned thereon to stop outward movement thereof through the orifice after delivery of a predetermined quantity of material.

5. A device for dispensing granular material comprising a container having a dispensing orifice through its bottom, a bracket within the container, a spring carried by the bracket, a ball chain secured at its inner end to the spring and slidably extending through the orifice, each ball of the chain being of a diameter snugly fitting but passable through the orifice, and means for normally sealing the discharge end of the orifice, including a washer mounted on the chain at a point to normally engage the container around the orifice.

6. A device for dispensing granular material comprising a container having a dispensing orifice therein and means for moving material from the container through the orifice, including a flexible elongated, sectional, beaded dredge member disposed at its inner end within the container and slidably extending at its other end through the orifice, each bead of said dredge member constituting a section and being of a diameter snugly fitting but passable through the orifice and said beads presenting material carrying spaces therebetween.

VERN ORRIEN RING.